(12) United States Patent
Klein

(10) Patent No.: US 6,689,259 B1
(45) Date of Patent: Feb. 10, 2004

(54) MIXED GAS GENERATOR

(76) Inventor: Dennis Klein, 1729 Cypress Ave., Belleair, FL (US) 33756

( * ) Notice: Subject to any disclaimer, the term of this patent is extended or adjusted under 35 U.S.C. 154(b) by 0 days.

(21) Appl. No.: 10/065,111

(22) Filed: Sep. 18, 2002

Related U.S. Application Data

(63) Continuation-in-part of application No. 09/635,448, filed on Aug. 10, 2000, now abandoned, which is a continuation of application No. 09/015,895, filed on Jan. 30, 1998, now abandoned.

(51) Int. Cl.[7] .......................... C25B 1/04; C25B 15/00; C25B 9/00
(52) U.S. Cl. ................. 204/230.5; 204/230.8; 204/240; 204/241; 204/274; 204/278
(58) Field of Search .............................. 204/278, 228.5, 204/237, 238, 230.2, 274, 241, 230.5, 240, 229.6

(56) References Cited

U.S. PATENT DOCUMENTS

| | | | |
|---|---|---|---|
| 4,014,777 A | 3/1977 | Brown | |
| 5,244,558 A | * 9/1993 | Chiang | ........................ 204/241 |
| 5,628,885 A | 5/1997 | Lin | |
| 5,711,865 A | 1/1998 | Caesar | |

* cited by examiner

*Primary Examiner*—Donald R. Valentine
(74) *Attorney, Agent, or Firm*—Dennis G. LaPointe; Mason Law, P.A.

(57) ABSTRACT

The present invention is a device, which generates a hydrogen and oxygen gas, preferably used for welding. The hydrogen and oxygen gas is generated by an electrolyzing process. Electrolyte is pumped into the hydrogen-oxygen generator where the gas is separated from the electrolyte by applying a direct current voltage across the generator. Oxygen is formed in one part, hydrogen in the other and then combined to form the gas. As the gas is generated, pressure is built up. When the pressure reaches an operating pressure, the gas is pumped via the plumbing system into the electrolyte reservoir, through a filtering process, and stored in a gas reservoir that is connected to a supply line. In operation the supply line is attached to a torch.

11 Claims, 2 Drawing Sheets

MIXED GAS GENERATOR

CROSS REFERENCE TO RELATED APPLICATIONS

This application is a continuation in part of the application Ser. No. 09/635,448 filed Aug. 10, 2000, now abandoned, which is a continuation of 09/015,895 filed on Jan. 30, 1998 titled hydrogen & oxygen generator, now abandoned.

BACKGROUND OF INVENTION

1. Field of Invention

The present invention relates to gas welding machines. More particularly, the present invention relates to gas welding machines using a generator to produce gas needed for welding by electrolyzation.

2. Background of the Invention

Welding equipment typically consists of a torch which is connected by hoses to two tanks containing compressed gas. When the two gases are combined at the torch they produce a combustible mixture which is ignited to produce a very hot flame. In order for the tanks to contain enough volume to sustain the flame for a significant period of time, the gases are stored in the tanks at very high pressure. To withstand the pressure the tanks are manufactured from steel and the walls of the tanks need to be very thick to prevent rupturing. These two factors result in tanks which are large, cumbersome and difficult to impossible for a person to carry. What is desired is a gas source which provides a highly combustible mixture and overcomes the size and weight problems associated with tanks.

Numerous innovations for hydrogen & oxygen generator have been provided in the prior art that are described as follows. Even though these innovations may be suitable for the specific individual purposes to which they address, they differ from the present invention as hereinafter contrasted.

In U.S. Pat. No. 5,628,885, titled Extraction Installation for Hydrogen and Oxygen, invented by Yang C. Lin, an electrolytic apparatus for a welding machine is described which uses an electrolytic cell a mixing tank and a multi-control switch. The electrolytic cell is composed of several pieces of electrode plates, which are connected to the positive and negative poles of electrolysis power. After electrolysis, the gas proceeds in a storage tank and the liquid is guided back into the electrolytic cell for recycling use. The fuel gas then goes into the first chamber to get rid of water. In the meantime, part of the fuel gas will be combined with carbohydrate dissolvent to alter its fuel composition and then be recombined with the rest of the gas to provide a desired fuel. This way, the heat of the gas can be heightened, flame temperature can be lowered and the output ratio for the fuel gas can be controlled and adjusted to attain a welding gun's flame within a comprehensive scope of temperature and heat. Furthermore, this invention uses the pressure from a multi-control switch monitoring the process to keep it in a tolerable range to provide safety protection.

The '885 patent is an electrolytic apparatus for a welding machine which uses an electrolytic cell to generate welding gases. The gases are stored in a mixing tank before being processed through a water separator where the excess water is removed. A portion of the gas is then combined with a carbohydrate dissolvent which causes the heat of the gas to be heightened. This modified gas is recombined with the balance of the gas which results in a lower flame temperature. The output ratio for the fuel gas is controlled and adjusted so that the welding gun's flame is operable within a preselected range of temperature and pressure. The present invention is a device, which generates gas by an electrolyzing process. Electrolyte is pumped into the hydrogen-oxygen gas generator where the gas is separated from the electrolyte by applying a direct current voltage across the generator. Oxygen is formed in one part, hydrogen in the other and then combined to form the gas. As the gas is generated, pressure is built up. When the pressure reaches an operating pressure, the gas is pumped via the plumbing system into the electrolyte reservoir, through a filtering process, and stored in a gas reservoir that is connected to a supply line. In operation the supply line is attached to a torch.

In U.S. Pat. No. 5,409,371, titled Oxygen Welding and Incorporating a Novel Gas Separation System, invented by Arnold Z. Gordon and oxygen apparatus is described which is capable of generating its oxygen needs without an external oxygen source from a self-contained solid state electrolytic cell which separates oxygen from the air. The cell employs flexible, ductile ceramic composite of solid electrolyte. The ductile ceramic composite electrolyte comprises a continuous, ordered, repeating, interconnected ductile metallic array substantially surrounded by and intimately integrated within a ceramic matrix. The cell is connected to a power supply so when current is passed through the cell, oxygen or nitrogen is separated from the air passing through the cell.

The present invention differs from the patented invention because the patented invention is an oxygen welding apparatus which is capable of generating its oxygen needs without an external oxygen source from a self-contained solid state electrolytic cell which separates oxygen from the air. The patented invention functions with a flexible, ductile ceramic composite as the solid electrolyte. The present invention functions with a liquid electrolytic, which is pumped into a hydrogen-oxygen gas generator where the hydrogen and oxygen gas is separated from the electrolyte by applying a direct current voltage across the generator. The mechanism for generating the gas is different.

In U.S. Pat. No. 5,407,348, titled Torch with Integral Flashback Arrestors and Check Valves, invented by Carl W. Mimsa and Roger D. Zwicker, a torch which uses oxygen and fuel gas, a first flashback assembly are formed as an integral part of the torch handle. Each flashback assembly includes three primary components as follows: a porous metal flashback arrestor, a retainer and a check valve subassembly. In the preferred embodiment, the porous metal flashback arrestor is mounted on one end of the retainer and the check valve subassembly is held in the other end. In an alternative embodiment, the check valve subassembly is positioned on the interior of the porous metal flashback arrestor. Each flashback assembly can be easily removed and replaced during periodic reconditioning of the torch. The flashback assemblies utilize a parts-in-place principle which precludes operation of the torch unless both flashback assemblies are installed in the torch handle. The porous metal flashback arrestor is designed to reduce the possibility of migration of a flashback upstream from the torch. The check valve subassemblies are designed to reduce the possibility of reverse flow of gas upstream from the torch. This invention does not prevent flashback from occurring; however, it does reduce the possibility of a flashback migrating from the torch into the hose or other components in a typical oxy-fuel cutting, heating, soldering, brazing or welding system.

The patented invention differs from the present invention because the patented invention is a torch which uses oxygen and a fuel gas. The patented invention functions to reduce the possibility of a flashback migrating from the torch into the hose or other components in a typical oxy-fuel cutting, heating, soldering, brazing or welding system. The patented invention lacks features similar to the present invention.

In U.S. Pat. No. 4,081,656, titled Brown Mar. 28, 1978 Arc-assisted Oxy/hydrogen Welding, invented by Yull Brown, this invention relates to welding, brazing or the like utilizing a mixture of hydrogen and oxygen generated in substantially stoichiometric proportions in an electrolytic cell by electrical dissociation of water, the mixture so generated being passed from the generator through a flashback arrestor and thence to a burner where the gases are ignited. The invention also relates to atomic welding in which the above mentioned mixture is passed through an arc causing dissociation of both the hydrogen and oxygen into atomic hydrogen and oxygen which on recombination generate an intensely hot flame.

The patented invention differs from the present invention because the patented invention is a welding apparatus which generates hydrogen and oxygen in an electrolytic cell by electrical dissociation of water. The resultant gas which is in stoichiometric proportions is directed to a torch which has a pair of tungsten electrodes in the out put path of the gas. An arc is drawn between the electrodes causing the disassociation of the hydrogen and oxygen which produces a significantly hotter flame. The present invention is a device to generate electrolytically, gas needed for welding. The present invention lacks the feature of causing the gas to become disassociative.

In U.S. Pat. No. 4,014,777, titled Welding, invented by Yull Brown, this invention relates to welding, brazing or the like utilizing a mixture of hydrogen and oxygen generated in substantially stoichiometric proportions in an electrolytic cell by electrolytic dissociation of water, the mixture so generated being passed from the generator through a flashback arrestor and thence to a burner where the gases are ignited. The invention also relates to atomic welding in which the above mentioned mixture is passed through an arc causing dissociation of both the hydrogen and oxygen into atomic hydrogen and oxygen which on recombination generate an intensely hot flame.

The patented invention differs from the present invention because the patented invention is a welding apparatus which generates hydrogen and oxygen in an electrolytic cell by electrical dissociation of water. The resultant gas which is in stoichiometric proportions is directed to a torch which has a pair of tungsten electrodes in the out put path of the gas. An arc is drawn between the electrodes causing the disassociation of the hydrogen and oxygen which produces a significantly hotter flame. The present invention is a device to generate, electrolytically, gas needed for welding. The present invention lacks the feature of causing the gasses to become disassociative.

Numerous innovations for hydrogen & oxygen generators have been provided in the prior art that are adapted to be used. Even though these innovations may be suitable for the specific individual purposes to which they address, they would not be suitable for the purposes of the present invention as heretofore described.

It is, therefore, to the effective resolution of the aforementioned problems and shortcomings of the prior art that the present invention is directed.

However, in view of the prior art in at the time the present invention was made, it was not obvious to those of ordinary skill in the pertinent art how the identified needs could be fulfilled.

SUMMARY OF INVENTION

The present invention is a self producing hydrogen and oxygen gas generator including an electrolyte reservoir having a top portion adapted to contain hydrogen and oxygen in a gaseous state and a bottom portion containing electrolytic fluid, a hydrogen and oxygen generator, a pump fluidly interposed between the bottom of the electrolyte reservoir and the hydrogen and oxygen generator wherein the pump draws electrolytic fluid from the electrolyte reservoir and pumps it to the hydrogen and oxygen generator, a radiator fluidly connected to and interposed between the hydrogen and oxygen generator and the electrolyte reservoir, the radiator adapted to cool the generated hydrogen and oxygen gas before returning to the top portion of the electrolyte reservoir, an interstitial space within the reservoir above the electrolytic fluid in the top portion of the electrolytic reservoir wherein the generated hydrogen and oxygen gas accumulates, and an interstitial area defined by the accumulation of the gas. An electrical conductor may be contained within the hydrogen and oxygen generator and a pressure controller fluidly coupled to the electrolyte reservoir and circuitry coupled to the electrical conductor may also be provided whereby electric current to the electrical conductor is connected responsive to insufficient gas pressure within the electrolyte reservoir. Additionally, a pressure controller fluidly coupled to the electrolyte reservoir and circuitry coupled to the electrical conductor may be provided whereby electric current to the electrical conductor is terminated responsive to excessive gas pressure within the electrolyte reservoir. A gas reservoir is provided and adapted to store accumulated gas and a filter fluidly coupled to the top portion of the electrolytic reservoir removes moisture.

Additional embodiments include various safety features of the self-producing hydrogen and oxygen generating welder. Such features include a microprocessor controlled D.C. amperage regulator adapted to regulate the D.C. amperage from the power source to the hydrogen and oxygen generator. This feature is in contrast to most systems known in the art that continue to build in amperage when first started causing an amperage overload on the electrical system and excessive heat buildup inside the generator.

Yet another embodiment of the present invention includes a microprocessor controlled cut-off switch that will terminate the power source to the welder in response to a malfunction of the pump and a microprocessor controlled cut-off switch that will terminate the power source to the welder in response to a low electrolyte solution level within the electrolyte reservoir.

An additional embodiment of the present invention includes a microprocessor controlled liquid crystal display. The LCD displays various operating statistics of the welder, including hours of operation, amperage, pressure gauge readings and a variety of indicator lights.

In an additional embodiment of the present invention, a microprocessor controlled polarity change system is used to change the polarity of the electrical conductor. This change in polarity results in the removal of calcium deposits which maximizes the efficiency of the generator.

In yet another embodiment of the present invention, a microprocessor controlled cool-down system is used to operate a generator fan and the pump. The fan and pump will continue to operate for a predetermined period to allow the system to cool-down following a manual shut-off of the welder.

The types of problems encountered in the prior art are that large cumbersome tanks are needed to contain the oxygen and acetylene required for welding. The tanks are by means of thick high pressure hose connected to a torch. Further, emissions of Co2, CO and SO2 are produced by the combustion of oxygen and acetylene and the dregs resulting from the burning of oxygen and acetylene are avoided.

In the prior art, unsuccessful attempts to solve this problem were attempted namely: smaller tanks, which though lighter, contain less volume. However, the problem was solved by the present invention because the tanks are totally replaced by a lightweight hydrogen and oxygen gas generator.

Innovations within the prior art are rapidly being exploited, as there is need for small, efficient, lightweight, welding devices, which are pollution free.

The present invention went contrary to the teaching of the art by collecting the gas in a single reservoir rather than collecting separate hydrogen and oxygen gases in separate reservoirs.

The present invention solved a long felt need for a pollution free, transportable welding device.

The present invention produced unexpected results namely: the combusted byproduct is water which is a non pollutant.

A synergistic effect was produced utilizing the present invention because Co2, CO, and SO2 are not generated as by-products of burning the gaseous combination. Further, the dregs resulting from the burning of oxygen and acetylene are avoided.

Accordingly, it is an object of the present invention to provide a gas welding machine with a hydrogen-oxygen generator, which generates hydrogen and oxygen gas by electrolyzing an electrolyte.

More particularly, it is an object of the present invention to provide a small, lightweight device, which is less costly, provides a longer operation time and is more portable than the conventional welding machine.

In keeping with these objectives, and with others, which will become apparent hereinafter, one feature of the present invention resides, briefly stated, a hydrogen and oxygen gas generator, which generates a hydrogen and oxygen gas from water.

When the self-producing hydrogen and oxygen generating welder is designed in accordance with the present invention, and electrolytic fluid is placed in an electrolyte reservoir.

In accordance with another feature of the present invention, the electrolytic fluid is pumped by an electromagnetic pump into a hydrogen and oxygen generator.

Another feature of the present invention is that a voltage is placed across the hydrogen and oxygen generator causing hydrogen and oxygen gas to separate from the electrolyte.

Yet another feature of the present invention is that electrolytic fluid and the separated hydrogen and oxygen gas flow to the electrolyte reservoir.

Still another feature of the present invention is a pressure gauge providing an indication of the pressure in the electrolyte reservoir.

Yet still another feature of the present invention is that a hydrogen pipe removes gas from the top of the electrolyte reservoir.

Still yet another feature of the present invention is that the hydrogen pipe has a filter to remove impurities and water vapor from the gas.

Another feature of the present invention is that the hydrogen pipe has a non-return valve, which prevents gas from returning to the electrolyte reservoir.

Yet another feature of the present invention is that the hydrogen pipe has a valve, which regulates the flow of gas to a torch.

Yet another feature of the present invention is that a first broken plate ruptures when the pressure in the electrolyte reservoir exceeds a preselected value.

Yet still another feature of the present invention is that it is light in weight.

Still yet another feature of the present invention is that it is easily portable.

Another feature of the present invention is that pressure in the system is dependent on the amount of hydrogen & oxygen gas produced in the hydrogen and oxygen generator.

Yet another feature of the present invention is that hydrogen & oxygen gas production is controlled by a pressure controller.

The novel features which are considered characteristic for the invention are set forth in the appended claims. The invention itself, however, both as to its construction and its method of operation, together with additional objects and advantages thereof, will be best understood from the following description of the specific embodiments when read and understood in connection with the accompanying drawings.

It is to be understood that both the foregoing general description and the following detailed description are explanatory and are not restrictive of the invention as claimed. The accompanying drawings, which are incorporated in and constitute part of the specification, illustrate embodiments of the present invention and together with the general description, serve to explain principles of the present invention.

These and other important objects, advantages, and features of the invention will become clear as this description proceeds.

The invention accordingly comprises the features of construction, combination of elements, and arrangement of parts that will be exemplified in the description set forth hereinafter and the scope of the invention will be indicated in the claims.

BRIEF DESCRIPTION OF DRAWINGS

For a fuller understanding of the nature and objects of the invention, reference should be made to the following detailed description, taken in connection with the accompanying drawings, in which.

Detailed Description

Figure 1:
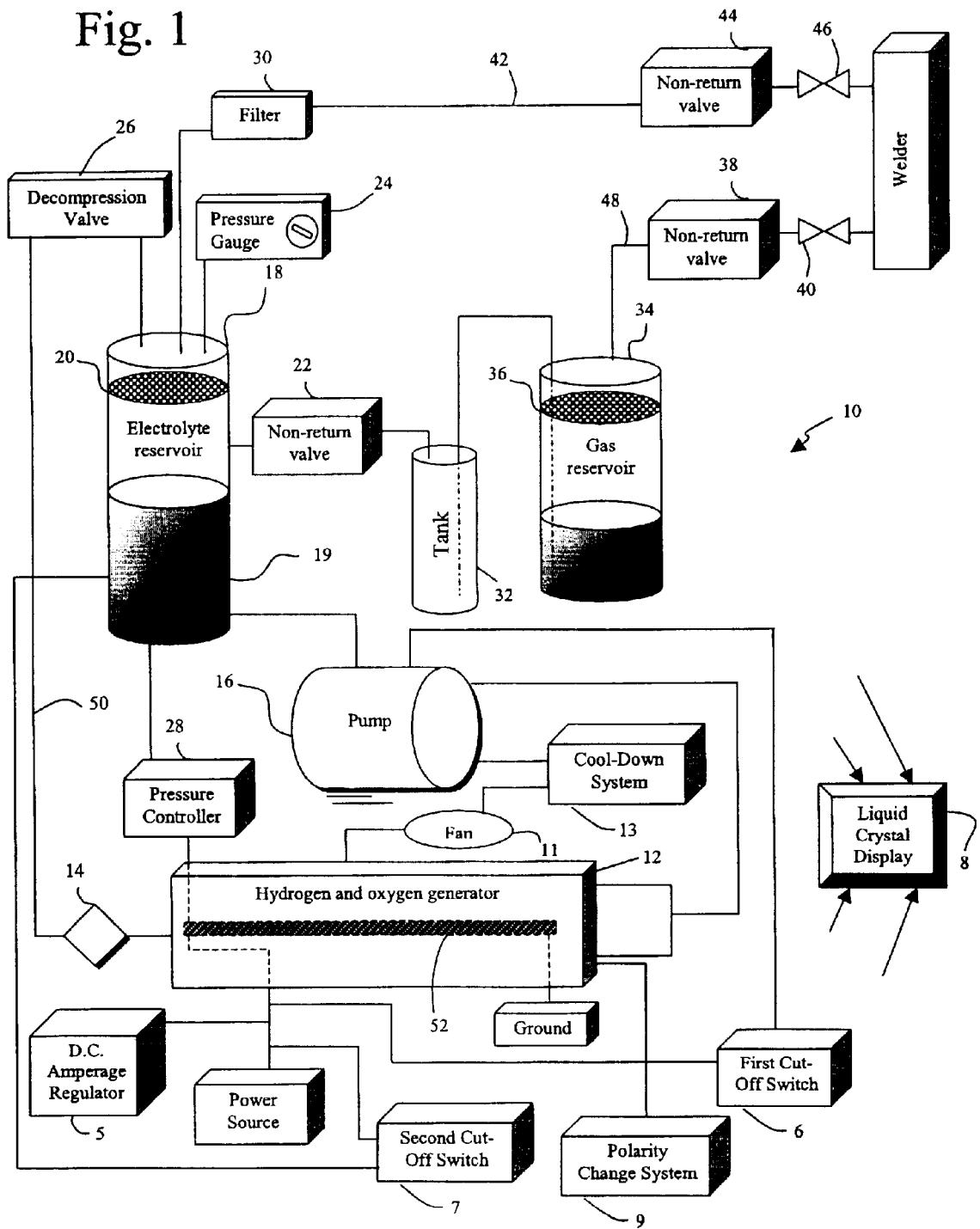
FIG. 1 is a flow diagram of a self producing hydrogen and oxygen generating welder.

Firstly, referring to FIG. 1 which is a flow diagram of a self producing hydrogen and oxygen generating welder 10. The self producing hydrogen and oxygen generating welder 10 comprises an electrolyte reservoir 18, having a top and a bottom, containing electrolytic fluid 19 therein. The electrolyte reservoir 18 comprises a first broken plate 20 which is sealably and circumferentially positioned around a top end of the electrolyte reservoir 18. The first broken plate 20 functions to release gas pressure within the electrolyte reservoir 18 when exceeding a pre-determined safety level.

The self-producing hydrogen and oxygen generating welder 10 further comprises an electromagnetic pump 16 which is connected at one distal end to the bottom of the electrolyte reservoir 18. The electromagnetic pump 16 is connected at an opposite distal end to at least one hydrogen and oxygen generator 12 containing an electrical conductor 52 therein. The electrical conductor 52 is electrically connected on one distal end to an electrical ground. The opposite distal end of the electrical conductor 52 is electrically connected to one distal end of a pressure controller 28. The opposite distal end of the electrical conductor 52 is electrically connected to a power source. The electromagnetic pump 16 functions to circulate electrolytic fluid 19 from the electrolyte reservoir 18 through at least one hydrogen and oxygen generator 12 through a radiator 14 back into the electrolyte reservoir 18 via a gas pipe 50. The radiator 14 functions to cool the generated hydrogen and oxygen gas before returning to the electrolyte reservoir 18.

The pressure controller 28 connected to the electrolyte reservoir 18 and monitors the pressure therein. When gas pressure within the electrolyte reservoir 18 exceeds a predetermined level, electrical current is terminated to the electrical conductor 52 contained within the hydrogen and oxygen generator 12 thereby ceasing production of hydrogen and oxygen gas. When gas pressure within the electrolyte reservoir 18 drops below a pre-determined level, electrical current is connected to the electrical conductor 52 contained within the hydrogen and oxygen generator 12 thereby commencing production of hydrogen and oxygen gas. The preselected level is less than the preselected level required to cause a pressure release through the first broken plate 20.

The self producing hydrogen and oxygen generating welder 10 further comprises a first non-return valve 22 connected at one end to an upper end of the electrolyte reservoir 18 below the first broken plate 20. The first non-return valve 22 is further connected to a tank 32 at an opposite distal end.

The self producing hydrogen and oxygen generating welder 10 further comprises a filter 30 connected at one end of the electrolyte reservoir 18 above the first broken plate 20 and further connected at an opposite distal end to a third non-return valve 44 via a hydrogen pipe 42 which is connected at an opposite end to a hydrogen valve 46.

The self-producing hydrogen and oxygen generating welder 10 further comprises a decompression valve 26 connected at one end to the top end of the electrolyte reservoir 18 and further connected at a bottom end to the gas pipe 50.

The self-producing hydrogen and oxygen generating welder 10 further comprises a microprocessor controlled D.C. amperage regulator 5 adapted to regulate the D.C. amperage from the power source to the hydrogen and oxygen generator 12.

The self-producing hydrogen and oxygen generating welder 10 further comprises a first microprocessor controlled cut-off switch 6 adapted to terminate the power source to the welder in response to a malfunction of the pump 16.

The self-producing hydrogen and oxygen generating welder 10 further comprises a second microprocessor controlled cut-off switch 7 adapted to terminate the power source to the welder in response to an insufficient electrolyte solution condition within the electrolyte reservoir 18.

The self-producing hydrogen and oxygen generating welder 10 further comprises a microprocessor controlled liquid crystal display 8 adapted to display operating statistics regarding the welder, such statistics to include hours of operation, amperage, indicator lights and pressure gauge readings. The liquid crystal display receives input from a plurality of locations within the welder 10.

The self-producing hydrogen and oxygen generating welder 10 further comprises a microprocessor controlled polarity change system 9 adapted to change the polarity of the electrical conductor located within the hydrogen and oxygen generator 12.

The self-producing hydrogen and oxygen generating welder 10 further comprises a microprocessor controlled cool-down system 13 adapted to operate a generator fan 11 and the pump 16 wherein operation of the fan and the pump continue throughout a cool-down stage following manual shut-off of the welder 10.

Figure 2:
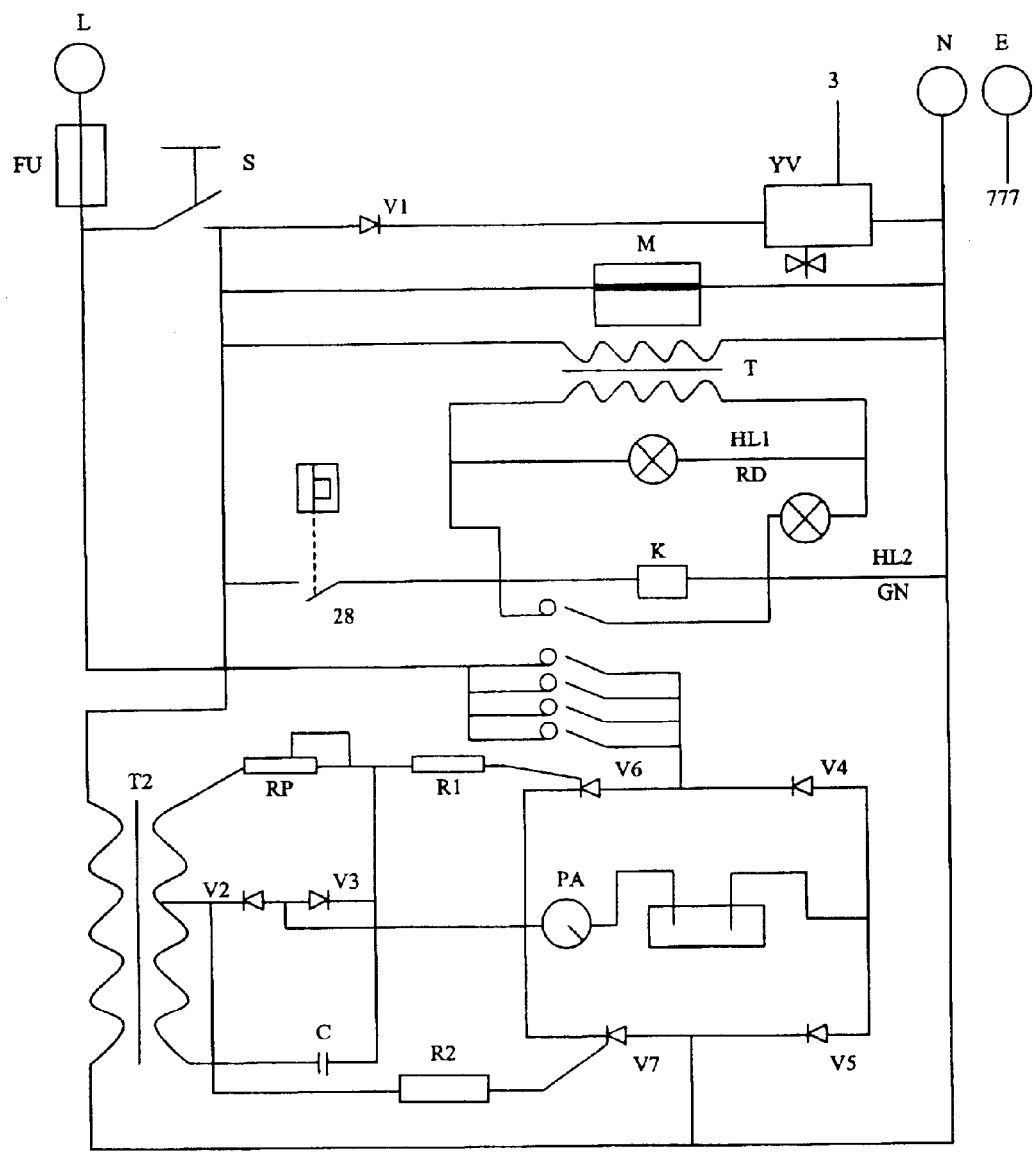
FIG. 2 is a schematic diagram of a self producing hydrogen and oxygen generating welder.

Referring to FIGS. 1 and 2 a single throw switch (S) is provided between an AC power source and a first indicating lamp (HL1), having an ON position and an OFF position. When the switch (S) is in the ON position the first indicating lamp (HL1) and second indicating lamp (HL2) are illuminated. The electromagnetic pump 16 is further electrically connected to the AC power source through the single throw switch (S) which forces electrolytic fluid 19 to flow from the electrolyte reservoir 18 to the hydrogen and oxygen generator 12. The ON position of switch (S) further energizes a relay coil (K) which operates a plurality of contacts connecting a power source (FU) to a plurality of silicone control rectifiers (V1, V2, V3, V4, V5, V6 and V7) which function to rectify the AC power source. The plurality of silicone control rectifiers (V1, V2, V3, V4, V5, V6 and V7) are electrically connected to the hydrogen and oxygen generator 12 which is electrically energized causing a production of hydrogen and oxygen gas. The electrolytic fluid 19 flows from the hydrogen and oxygen generator 12 along with the separated hydrogen and oxygen gas through the radiator 14 where a fan (M) provides cooling. A pressure controller 28 functions to sense the pressure within the electrolyte reservoir 18, when the pressure exceeds a preselected operating pressure the electrical voltage is removed from the hydrogen and oxygen generator 12 causing hydrogen and oxygen gas production to stop. As the volume of hydrogen and oxygen gas is depleted from the electrolyte reservoir 18, the pressure therein drops. When the pressure in the electrolyte reservoir 18 drops below a preselected operating pressure the pressure controller 28 returns the electrical voltage to the hydrogen and oxygen generator 12 causing hydrogen and oxygen gas production to resume.

It will be understood that each of the elements described above, or two or more together, may also find a useful application in other types of constructions differing from the type described above.

While the invention has been illustrated and described as embodied in a self producing hydrogen and oxygen generating welder, it is not intended to be limited to the details shown, since it will be understood that various omissions, modifications, substitutions and changes in the forms and details of the device illustrated and in its operation can be made by those skilled in the art without departing in any way from the spirit of the present invention.

It will be seen that the objects set forth above, and those made apparent from the foregoing description, are efficiently attained and since certain changes may be made in the above construction without departing from the scope of the invention, it is intended that all matters contained in the foregoing description or shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall therebetween. Now that the invention has been described.

What is claimed is:

1. A self producing hydrogen and oxygen generating welder comprising:

an electrolyte reservoir having a top portion adapted to contain oxygen and hydrogen in a gaseous state and a bottom portion containing electrolytic fluid;

a hydrogen and oxygen generator;

an electrical conductor contained within the hydrogen and oxygen generator;

a pump fluidly interposed between the bottom of the electrolyte reservoir and the hydrogen and oxygen generator wherein the pump draws electrolytic fluid from the electrolyte reservoir and pumps it to the hydrogen and oxygen generator;

a radiator fluidly connected to and interposed between the hydrogen and oxygen generator and the electrolyte reservoir, the radiator adapted to cool the generated hydrogen and oxygen gas before returning to the top portion of the electrolyte reservoir;

an interstitial space within the reservoir above the electrolytic fluid in the top portion of the electrolytic reservoir wherein the generated hydrogen and oxygen gas accumulates; and wherein the generated hydrogen and oxygen gas is drawn from the interstitial space as needed for welding applications.

2. The apparatus of claim 1 further comprising a pressure controller fluidly coupled to the electrolyte reservoir and circuitry coupled to the electrical conductor whereby electric current to the electrical conductor is connected responsive to insufficient gas pressure within the electrolyte reservoir.

3. The apparatus of claim 1 further comprising a pressure controller fluidly coupled to the electrolyte reservoir and circuitry coupled to the electrical conductor whereby electric current to the electrical conductor is terminated responsive to excessive gas pressure within the electrolyte reservoir.

4. The apparatus of claim 1 further comprising an oxygen gas reservoir adapted to store accumulated oxygen.

5. The apparatus of claim 1 further comprising a filter fluidly coupled to the top portion electrolytic reservoir and adapted to remove moisture.

6. The apparatus of claim 1 further comprising a microprocessor controlled D.C. amperage regulator adapted to regulate the D.C. amperage from the power source to the hydrogen and oxygen generator.

7. The apparatus of claim 1 farther comprising a first microprocessor controlled cut-off switch adapted to terminate the power source to the welder in response to a malfunction of the pump.

8. The apparatus of claim 1 further comprising a second microprocessor controlled cut-off switch adapted to terminate the power source to the welder in response to an insufficient electrolyte solution condition within the electrolyte reservoir.

9. The apparatus of claim 1 further comprising a microprocessor controlled liquid crystal display adapted to display operating statistics regarding the welder, such statistics to include hours of operation, amperage, indicator lights and pressure gauge readings.

10. The apparatus of claim 1 further comprising a microprocessor controlled polarity change system adapted to change the polarity of the electrical conductor.

11. The apparatus of claim 1 further comprising a microprocessor controlled cool-down system adapted to operate a generator fan and the pump wherein operation of the fan and the pump continue throughout a cool-down stage following manual shut-off of the welder.

* * * * *